United States Patent [19]
Schüler et al.

[11] Patent Number: 5,893,610
[45] Date of Patent: Apr. 13, 1999

[54] LONGITUDINAL ADJUSTING DEVICE IN MOTOR VEHICLE SEATS, PARTICULARLY TWO-DOOR MOTOR VEHICLES

[75] Inventors: Rolf Schüler, Heiligenhaus; Joachim Flick, Hückeswagen, both of Germany

[73] Assignee: Keiper GmbH & Co., Remscheid, Germany

[21] Appl. No.: 08/972,081

[22] Filed: Nov. 17, 1997

[30] Foreign Application Priority Data

Nov. 16, 1996 [DE] Germany ............ 196 47 447

[51] Int. Cl.[6] ............ A47C 1/024; B60N 2/12
[52] U.S. Cl. ............ 297/341; 297/344.1; 248/429; 248/430
[58] Field of Search ............ 297/341, 344.1; 248/429, 430

[56] References Cited

U.S. PATENT DOCUMENTS

| | | | |
|---|---|---|---|
| 3,931,995 | 1/1976 | Arai | 297/341 |
| 4,306,124 | 12/1981 | Kondo et al. | 248/429 X |
| 4,530,540 | 7/1985 | Hayden et al. | 297/341 |
| 4,695,097 | 9/1987 | Muraishi | 248/429 X |
| 4,743,066 | 5/1988 | Boisset et al. | 297/341 |
| 4,765,582 | 8/1988 | Babbs | 248/429 X |
| 4,770,463 | 9/1988 | Nishiro | 297/344.1 X |
| 4,796,951 | 1/1989 | Tamura et al. | 297/344.1 X |
| 4,844,542 | 7/1989 | Humer | 297/341 |
| 4,936,535 | 6/1990 | Johansson | 297/344.1 X |
| 4,973,104 | 11/1990 | Nakayama et al. | 297/341 |

FOREIGN PATENT DOCUMENTS

| | | |
|---|---|---|
| 0135596 | 7/1987 | European Pat. Off. . |
| 4423634 | 1/1996 | Germany . |

*Primary Examiner*—Jose V. Chen
*Assistant Examiner*—Rodney B. White
*Attorney, Agent, or Firm*—Friedrich Kueffner

[57] ABSTRACT

A longitudinal adjusting device in a motor vehicle seat, particularly for two-door motor vehicles, wherein the seat includes a backrest and a seat portion secured at running rails of a rail arrangement and wherein each running rail is longitudinally displaceably arranged in a guide rail. At least one running rail is supported at the respective guide rail through a spring member such that the running rail is biased forwardly. At least one running rail includes a releasable locking device for the longitudinal adjustment, and the locking device includes a positioning device for making it possible to find or reset a previously adjusted longitudinal seat position. The positioning device includes a positioning disk provided with a stop, wherein the positioning disk is rotatably supported on a structural component forming part of the moveable seat portion and wherein the positioning disk can be releasibly secured against the force of a torsion spring. The stop of the positioning disk limits the rotary movement of a rotary member which also has a stop and serves to transpose the linear movement of the running rail relative to the guide rail in relation to the return pushing movement of the seat, wherein at least one stop ring may be arranged between the positioning disk and the rotary member.

31 Claims, 3 Drawing Sheets

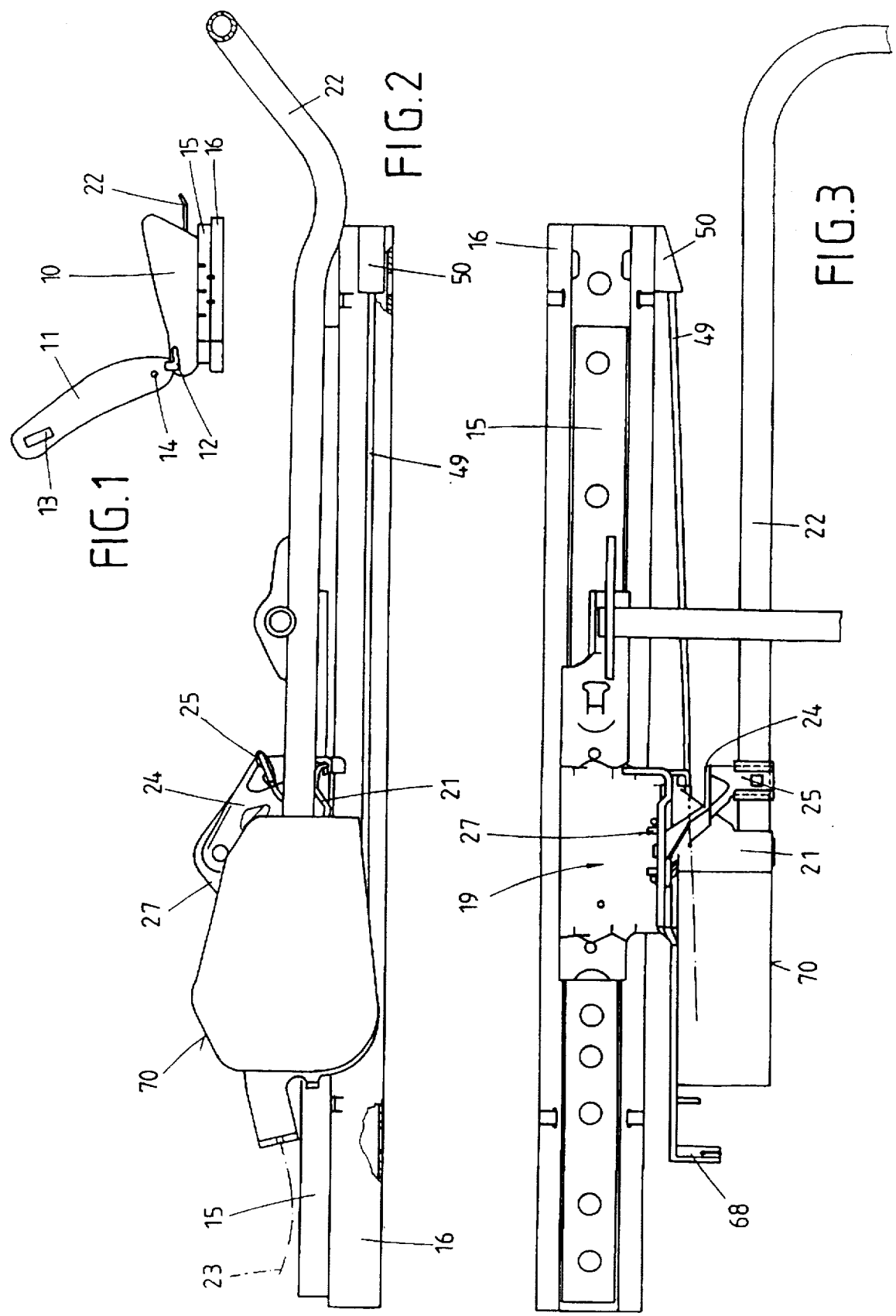

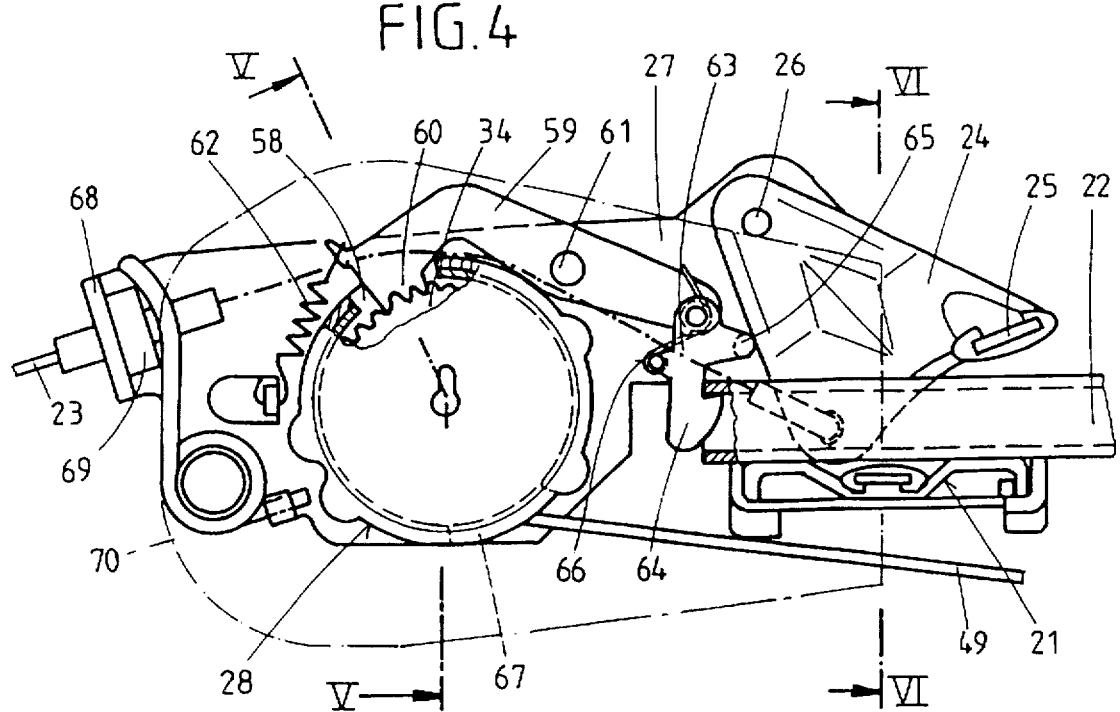
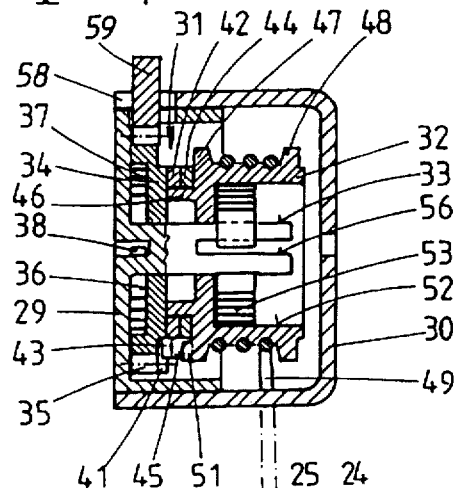
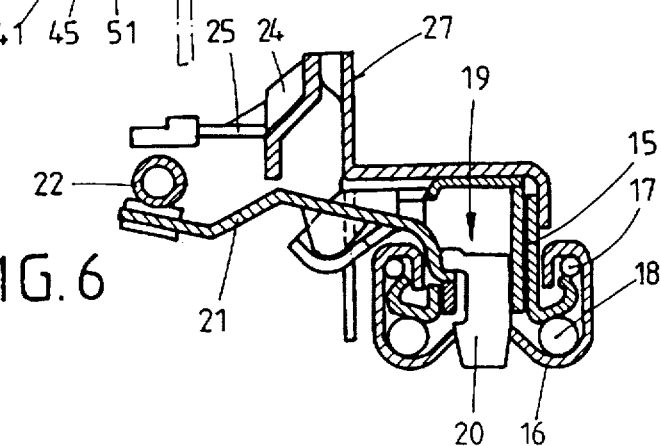

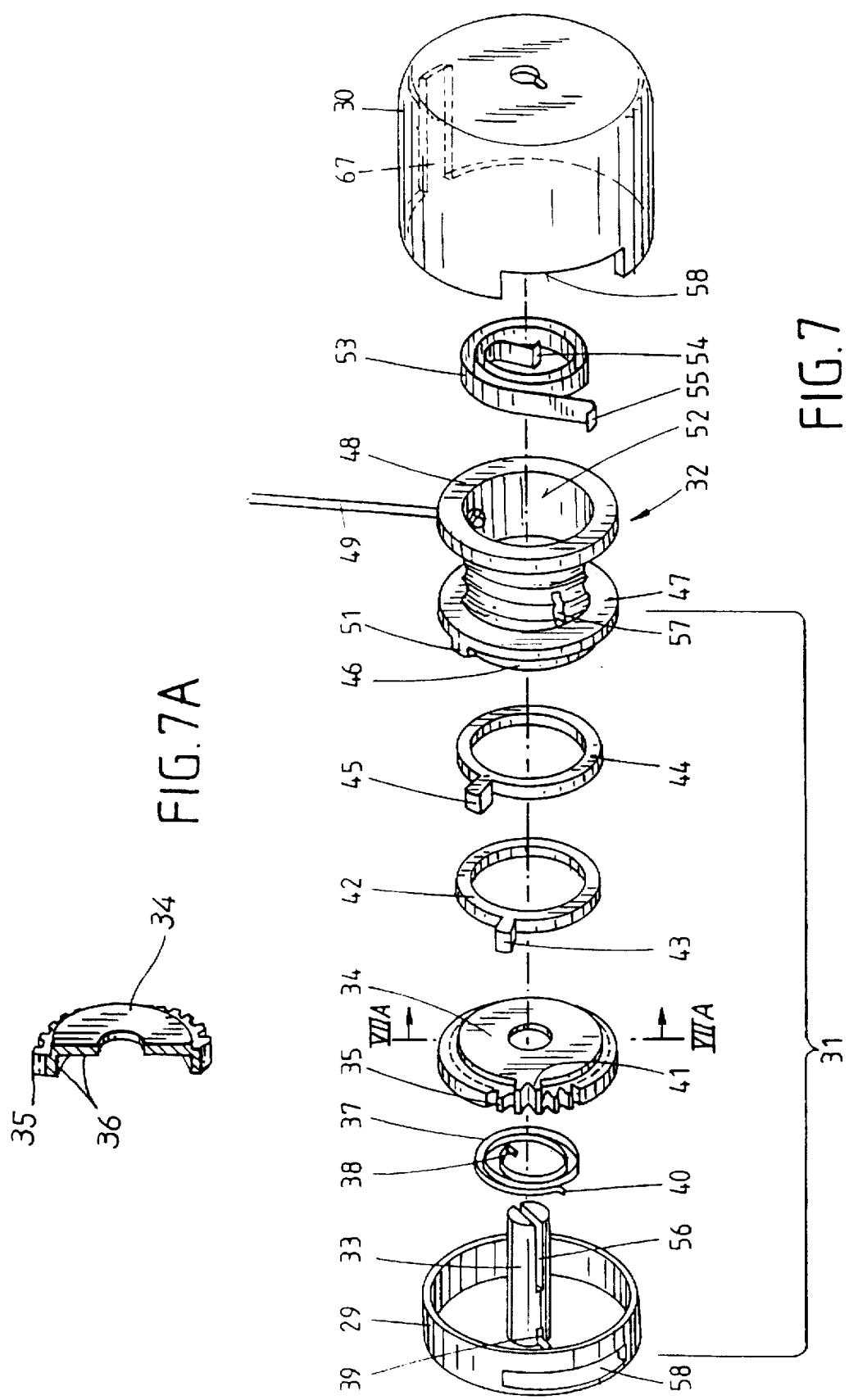

LONGITUDINAL ADJUSTING DEVICE IN MOTOR VEHICLE SEATS, PARTICULARLY TWO-DOOR MOTOR VEHICLES

BACKGROUND OF THE INVENTION

1. Field of the Invention

The present invention relates to a longitudinal adjusting device in motor vehicle seats, particularly for two-door motor vehicles. The backrest of the seat is connected to the seat portion through a joint fitting which may include an adjusting and securing device for the inclination of the backrest. The joint fitting includes a fitting component forming part of the seat portion and a pivotable fitting portion forming part of the backrest. One of the joint members has a pivot point about which the backrest can be swung forwardly after releasing a catch device. The seat portion is secured at running rails of a rail arrangement and each running rail is longitudinally displaceably arranged in a guide rail. At least one running rail is supported at the respective guide rail through a spring member such that the running rail is biased forwardly. At least one running rail includes a releasable locking device for the longitudinal adjustment, and the locking device includes a positioning device for making it possible to find or reset a previously adjusted longitudinal seat position.

2. Description of the Related Art

DE 44 23 634 A1 discloses a longitudinal adjusting device of the above-described type in which the positioning device includes another securing device by means of which, after the backrest has been swung forwardly and the seat has been pushed forwardly, a return swinging of the backrest into its position of use is prevented until the seat has once again reached its previously adjusted longitudinal position and is locked in this position. In this device, it is not possible without a previously modified adjustment of the longitudinal seat position, to place a load between the front seat and the rear seat, while still being able to transfer the front seat by a rearward swinging of the backrest and its locking device into a position of use. In addition, the positioning device and the securing device coupled to the positioning device are of cumbersome construction and substantially increase the cost of a vehicle seat equipped with such a device.

This is also true for the solution disclosed in EP 0 135 596 B1. In that solution, additional friction losses occur when forwardly swinging the backrest and forwardly pushing the seat because the running rail is constructed of two pieces and is composed of a forward transport rail and the support rail. Separate devices for connecting the running rail to the guide rail are required for both parts of the running rail which are displaceable relative to each other, so that a blocking device, on the one hand, and a locking device, on the other hand, are required. The blocking device is equipped with a positioning member which ensures that the positioned locking of the forward transport rail can only be effected when the backrest has once again assumed its position of use and the forward transport rail has reached during the backward swinging movement of the backrest once again a parallel position relative to the support rail. Only the forward transport rails on both longitudinal sides of the seat support the seat portion as well as the backrest. The requirement of having to provide for each part of the running rail, i.e., the support rail as well as the forward transport rail, a separate device for locking in longitudinal direction means that the device has a plurality of structural components which require substantial structural space.

Finally, in both solutions discussed above, the problem of reinforcing the forward movement during adjusting the longitudinal seat position by using spring members is not discussed, as is apparent from U.S. Pat. No. 3,931,995. Even though this problem is not discussed in the two above-described solutions, helical springs requiring additional structural space are also used in these constructions between the guide rails and the running rails.

SUMMARY OF THE INVENTION

Therefore, it is the primary object of the present invention to improve a longitudinal adjusting device in a seat of motor vehicles in such a way that the adjusted longitudinal seat position can safely be reached again even after the backrest has been swung forwardly and the seat has been pushed forwardly during the return movement of backrest and seat for locking the seat, wherein, however, seat and backrest can be locked in a position of use even earlier than that when reaching an intermediate position due to an obstacle. In addition, the quantity of structural components is to be reduced and a compact structural unit is to be provided.

In accordance with the present invention, the positioning device includes a positioning disk provided with a stop, wherein the positioning disk is rotatably supported on a structural component forming part of the moveable seat portion and wherein the positioning disk can be releasibly secured against the force of a torsion spring. The stop of the positioning disk limits the rotary movement of a rotary member which also has a stop and serves to transpose the linear movement of the running rail relative to the guide rail in relation to the return pushing movement of the seat, wherein at least one stop ring may be arranged between the positioning disk and the rotary member.

The structural components for receiving the positioning disk may be, for example, the seat frame or the seat height adjuster; however, usually the structural component will be the running rail. As soon as the positioning disk in accordance with this solution has been released, which takes place simultaneously with releasing the locking device, the torsion spring rotates the positioning disk back until its stop is held by the stop of the rotary member as soon as the rotary member is no longer moved as a result of the adjusted seat position. Consequently, when releasing the catch device for forwardly swinging the backrest and simultaneously releasing the locking device for longitudinally adjusting the seat, a longitudinal adjustment of the seat can be carried unimpededly in addition to a forward swinging movement of the backrest because the stop of the rotary member moves away from the stop of the positioning disk. However, when the seat is subsequently moved back, the return pushing movement ends where the stop of the rotary member comes to a standstill as a result of meeting the stop of the positioning disk. As a result, the previously adjusted longitudinal seat position has been found and can be locked again by the locking device. On the other hand, the return pushing movement of the seat can be interrupted already before that and the backrest can be swung back, so that the locking device can now hold the running rail relative to the guide rail in the longitudinal seat position reached at that time. This solution makes possible a compact construction with relatively few structural components.

For holding the positioning disk, the positioning disk advantageously can be secured by means of a catch lever which is supported on the running rail and is spring-biased in the locking direction, wherein the catch lever is coupled to a release stirrup for the locking device through a connecting lever which can be adjusted so as to be ineffective together with the locking device for the forward swinging movement of the backrest. For releasing the locking device, the connecting lever advantageously has a catch nose which is in engagement with the release stirrup and the connecting lever is held with a feeling projection by means of a contact pressure spring in contact with the release lever for the actuation of the release stirrup of the locking device, wherein the release lever is coupled through a Bowden cable to the locking device which facilitates the forward swinging movement of the backrest.

For covering a sufficiently large adjusting distance for the longitudinal adjustment of the seat with an approximately uniform force pattern, the positioning disk, which is supported on an axis fixed to the running rail, has a recess for receiving a spiral spring which forms the torsion spring, wherein the spiral spring is with its inner end held at the axis and its outer end is secured to the periphery of the recess, while the outer circumference of the positioning disk is constructed as a toothing for engaging a toothed segment of the locking lever and the positioning disk has on an end face thereof the stop for resetting the adjusted longitudinal seat position when the seat is pushed back.

A practical transposition of the linear movement of the running rail into a rotary movement of the rotary member can be achieved by mounting on the same axis of the positioning disk a winding drum forming the rotary member for a pull cable attached to the winding drum. The free end of the pull cable is attached to the guide rail or to the vehicle floor, and, either concentrically or eccentrically relative to the outer surface of the winding drum, a spiral spring is arranged in the interior of the winding drum for reinforcing the forward movement of the seat, wherein the inner end of the spiral spring is secured in a slot of the axis, while the outer end of the spiral spring is fixedly attached to the winding drum and the winding drum has on its end face facing the positioning disk a stop corresponding to the stop of the positioning disk.

In accordance with an advantageous feature, in order to adapt to the maximum displacement movement of the running rail relative to the guide rail, one or more stop rings may be arranged between the winding drum and the positioning disk, wherein the stops of the stop rings correspond with respect to position and dimensions to the stops of the positioning disk, on the one hand, and to the stop of the winding drum, on the other hand, and all stops rest against each other to form a stack of stops when reaching the seat adjusting position.

The object of achieving a compact and space-saving structural unit can be achieved particularly by arranging the axis for supporting the positioning disk, the winding drum and the stops disks and for holding the spiral springs in the center of a housing which has at its circumference two cutouts, wherein the arm of the locking lever securing the positioning disk extends through one cutout and the pull cable extends through the other cutout. The housing receiving the positioning disk, the winding drum, the stop ring and the spiral springs may be attached to a support plate which also supports the locking lever and the release lever on pins, wherein the support plate is fixedly connected to the running rail and has an angular portion for supporting the Bowden cable.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic side view of a vehicle seat;

FIG. 2 is a side view, seen from the interior of the seat, of a pair of rails arranged on a longitudinal side of the seat provided with the longitudinal adjusting device, wherein the positioning device is obscured by a cover;

FIG. 3 is top view of the pair of rails of FIG. 2 with the longitudinal seat adjusting device;

FIG. 4 is a side view, on a larger scale, seen from the seat interior, of the positioning device of FIG. 2 with the cover removed;

FIG. 5 is a sectional view, taken along sectional line V—V of FIG. 4 of the positioning device of FIG. 4;

FIG. 6 is a transverse sectional view, taken along sectional line VI—VI of FIG. 4, of the locking device and the pair of rails;

FIG. 7 is perspective exploded view showing the important components of the positioning device; and FIG. 7A is a cross-section through the perspective view of the positioning disk.

DESCRIPTION OF THE PREFERRED EMBODIMENTS

The vehicle seat schematically illustrated in FIG. 1 is composed of a seat portion 10 and a backrest 11 connected through a joint fitting, not shown, to the seat portion 10 so as to be adjustable with respect to its inclination. In addition, the backrest 11 can be swung forwardly about the pivot point 14 relative to the seat portion 10 by means of a handle 13 connected to a catch device 12. The seat portion 10 is connected at the bottom thereof at both longitudinal sides of the seat to a running rail 15 each of which engages in a guide rail 16 secured to the vehicle floor, wherein, in the illustrated embodiment, as can be seen in FIG. 6, the running rail 15 is supported on the guide rail 16 so as to be longitudinally slidable on rolling bodies 17 and 18.

The guide rail has at its upwardly arched bottom, not designated in detail, cutouts which are arranged spaced apart from each other and one behind the other in longitudinal direction, wherein the cutouts form a row of teeth. At least one of several locking claws 20 engages in these cutouts, wherein the locking claws 20 are a component of a locking device 19 secured to the running rail 15. The locking claws 20 can be released against the force of a spring by actuating a transverse lever 21 which is also mounted on the running rail 15 by actuating a release stirrup 22 which is also mounted on the running rail 15. However, the locking device 19 which forms part of the longitudinal seat adjusting device can also be released by the handle 13 arranged at the backrest 11 together with the locking device 12 at the backrest; this can be achieved by actuating a release lever 24 through a Bowden cable 23 in such a way that the release lever 24 acts through an angle portion 25 in a releasing direction on the release stirrup 22 and, thus, on the transverse lever 21 in order to release the locking claws 20 from the toothing of the guide rail 16. The release lever 24 is mounted by means of a pin 26 on a support plate 27 which, in turn, is secured to the running rail 15. A housing composed of a lower housing part 29 and an upper housing part 30 is also attached to the support plate 27, wherein the housing receives the positioning device 31 together with a winding drum 32 constructed as a rotary member.

In the embodiment shown in FIGS. 5 and 7, the housing 28 of the positioning device 31 includes a lower housing part 29 and an upper housing part 30 which covers the positioning device. The housing parts 29 and 30 are of cup-shaped construction and engage over each other. An inwardly protruding axis 33 is located in the center of the lower housing part 29 which is attached to the support plate 27. A positioning disk 34 is rotatably mounted on this axis 33, wherein the positioning disk 34 has a toothing 35 over its entire outer circumference. On its end face facing the bottom of the lower housing part 29, the positioning disk 34 has a recess 36, wherein a spiral spring 37 acting as a torsion spring is arranged in the recess 36. With an inwardly angled end 38, the spiral spring 37 engages in a recess 39 of the axis 33, while the outer end of the spring is secured, in a manner not illustrated in detail, at the periphery of the recess 36 of the positioning disk 34. A stop 41 laterally protruding from the positioning disk 34 is provided on the end face located opposite the recess 36 in the area of the toothing 35. FIG. 7A illustrates recess 36, which is a circular depression in positioning disk 34 which serves to accept spiral spring 37.

As can be seen in FIGS. 5 and 7, a stop ring 42 is rotatably arranged next to the positioning disk 34 and coaxially to the axis 33, wherein the laterally protruding stop 43 of the stop ring 42 can come into contact with the stop 41 of the positioning disk 34. Another stop ring 44 is located next to the stop ring 42, wherein the also laterally protruding stop 45 of the stop ring 44 can come into contact with stop 43 of the stop ring 42.

A rotary member constructed as a winding drum 32 for transposing the linear movement of the running rail 15 into a rotary movement is arranged next to the stop ring 44. The winding drum 32 is also rotatably mounted on the axis 33 and the winding drum 32, in turn, supports the two stop rings 42 and 44 mentioned above on an annular projection 46 of the winding drum 32. The circumference of the winding drum 32 is on both sides defined by contact rings 47 and 48, wherein a pull cable 49 is wound on the drum 32 between the rings 47 and 48, and wherein one end of the pull cable 49 is attached to the winding drum 32, while the other end of the pull cable 49 is attached by means of a connecting piece 50 to the guide rail 16 in the forward portion thereof. The contact ring 47 of the winding drum 32 adjacent the stop rings 42 and 43 has at an end face adjacent the stop ring 44 in the outer circumferential area thereof also a stop 51 which can be brought into contact with the stop 45 of the stop ring 44.

Another torsion spring constructed as a spiral spring 53 is arranged in the interior 52 of the winding drum 32, wherein the inner end 54 of the spiral spring 52 is secured in a slot 56 of the axis 33, while the outer end 55 of the spiral spring 53 is secured in an opening 57 of the casing of the winding drum 32. The second spring 53 has the purpose of tensioning the winding drum 32, so that the pull cable 49 is also tensioned and tends to push the seat forwardly.

The lower housing part 29 as well as the upper housing part 30 of the housing 28 have coinciding cutouts 58 through which an arm of the catch lever 59 can engage with its toothed segment 60 in the toothing 35 of the positioning disk 34. This catch lever 59 is mounted so as to be pivotable on the support plate 27 by means of a pin 61 and is held in engagement with the toothing 35 of the positioning disk 34 by means of a blocking spring 62 attached to the support plate 27. The other end of the catch lever 59 is connected in a rotary articulated manner to a connecting lever 63 which can engage with a catch nose 64 at the release lever 22 in such a way that, in the illustrated embodiment, the catch nose 64 engages in the end of the tubular release stirrup 22. The connecting lever 63 additionally has a feeling projection 65 which is held in contact with the release lever 24. The contact between the feeling projection 65 and the release lever 24 is effected through a contact pressure spring 66, for example, in the form of a leg spring, which is tensioned in the clockwise direction of rotation of the connecting lever between the catch lever 59 and the connecting lever 63. In addition to the cutout 58, the upper housing part 30 of the housing 28 has a cutout 67 through which the pull cable 49 leaves the winding drum 32, so that the pull cable 49 can be secured through the connecting piece 50 to the guide rail 16 or the vehicle floor. For supporting the casing of the Bowden cable 23 relative the actual cable, the support plate 27 has an angular portion 68, wherein the support sleeve 69 of the Bowden cable can be resiliently secured to the angular portion 68. As can be seen particularly in FIGS. 2 and 3, the positioning device 31 together with the catch lever 59 and the connecting lever 63 are completely covered by a cover 70, wherein the cover 70 also covers the end portion of the release stirrup 22 and parts of the release lever 24.

The drawing shows the locked position of the running rail on the guide rail in which the vehicle seat is in such a position that, after swinging the backrest 11 and possibly pushing the seat portion 10 forwardly, the seat can be pushed back again into its previously adjusted longitudinal position after a passenger has climbed in the rear of the vehicle because the positioning disk 34 has maintained its position independently of the backrest position and the longitudinal seat position, so that the originally adjusted stop position is reset again. For effecting the forward movement of the seat without changing the adjusting position as mentioned above, initially the catch device 12 is released by means of the handle 13 for swinging the backrest and, simultaneously, the release lever 24 is pivoted in the clockwise direction by the Bowden cable 23 so that this pivoting movement causes the angled portion 25 of the release lever 24 to push down the release stirrup 22 which causes also the transverse lever 21, shown in FIG. 6, to be pivoted against the clockwise direction and, thus, the locking claws 20 of the locking device 19 are released from the guide rail 16, so that the running rail 15 can be pushed forwardly relative to the guide rail 16. However, simultaneously with the pivoting of the release lever 24, pivoting of the connecting lever 63 takes place, so that the catch nose 64 of the connecting lever 63 is released from the release stirrup 24 and, when the release stirrup 24 is pressed down, the connection to the connecting lever 63 is released, so that the locking spring 62 causes the locking lever 29 with its toothed segment 60 to remain in engagement with the toothing 35 of the positioning disk 34, so that the spiral spring 37 is secured and the stop 41 of the positioning disk 34 also remains unchanged.

The spiral spring 53 tensioned in the rearward initial position of the seat causes the winding drum 32 to rotate in clockwise direction, so that a tensile force is exerted on the pull cable 49 and the forward movement of the seat portion 10 is reinforced. In the forwardly pushed position of the seat portion 10 and with the forwardly folded backrest 11, it is easier to step into the rear of the motor vehicle. Subsequently, the seat can be pushed back again into its original position up to the stop 41 and the backrest 11 can be swung back into its position of use shown in FIG. 1. As soon as the backrest has once again assumed its original position of inclination, the connection lever 63 is also pivoted back by the contact spring 66 into the position shown in FIG. 4 in which the release lever 24 also has again assumed the position shown in FIG. 4. During the backward movement of the seat portion 10, the pull cable 49 is at least partially wound from the winding drum and tensions the spiral spring 53. However, the seat portion 10 can only be pushed back until the stop 51 of the winding drum 32 comes into contact through the stops 45 and 43 with the stop 41 of the positioning disk 34 which is held by the catch lever 59.

The seat is now again pushed back into its originally adjusted position. However, the return movement of the seat portion 10 can also be stopped earlier, wherein the transverse lever 21 is not stressed by the release stirrup and the release lever 24 because the backrest 11 is swung back, so that the spring-biased locking claws 24 again can enter the recesses of the guide rail 16 and lock the longitudinal seat position which has been reached.

However, if a different longitudinal seat position than the previously adjusted position is to be newly adjusted so that it can be found again, i.e., the reset position, the release stirrup 22 has to be pulled up at its forward end, so that its rearward end is pivoted downwardly and, on the one hand, presses the transverse lever 21 also downwardly and, on the other hand, releases the locking claws 20 from their locking position at the guide rail 16. However, the catch lever 59 is simultaneously pivoted in the clockwise direction by the connecting lever 63 which is in engagement with the release stirrup 22, so that the toothed segment 60 of the catch lever 59 is disengaged from the toothing 35 of the positioning disk 34 against the force of the locking spring, and the spiral spring 37 is now capable by rotating the position disk 34 of moving the stop 41 through the stops 43 and 45 of the stop rings 42 and 44 to the stop 51 of the winding drum 32 acting as rotary member, so that the winding drum 32 is rotated by the pull cable 49 in accordance with the displacement movement.

Once the desired longitudinal position of the seat portion 10 has been reached and the release stirrup 22 is no longer actuated and returns into the position shown in FIG. 4, the locking spring 62 pulls the catch lever 59 with its toothed segment 60 again into engagement with the toothing 35 of the positioning disk 34. The stop 41 of the positioning disk 34 is now fixed at this location, so that a new reset position has been adjusted. If the backrest 11 is now to be swung forwardly and the seat portion 10 is to be pushed forwardly once again in accordance with the initially described manner of operation in order to enable a passenger to get into the rear of the vehicle, the seat portion 10 can now only be returned at most into the previously adjusted position. A prior interruption of the return movement is once again possible, as already described above.

The embodiment of the present invention described above and illustrated in the drawing is only an example of the present invention. The invention is not limited to this embodiment. Rather, various further developments and embodiments of the invention are possible.

While specific embodiments of the invention have been shown and described in detail to illustrate the inventive principles, it will be understood that the invention may be embodied otherwise without departing from such principles.

We claim:

1. A longitudinal adjusting device in a motor vehicle seat having a backrest and a seat portion, the longitudinal adjusting device comprising a joint fitting connecting the backrest to the seat portion, the joint fitting comprising a fitting component forming part of the seat portion and a pivotable fitting component forming part of the backrest, wherein one of the fitting components has a pivot point about which the backrest can be pivoted forwardly after release of a catch device, a rail arrangement comprising running rails attached to the seat portion and guide rails for longitudinally displaceably receiving the running rails, wherein at least one of the running rails is supported at one of the guide rails through a spring member such that the running rail is biased forwardly, wherein at least one of the running rails includes a locking device which is releasable for longitudinal adjustment, and wherein the locking device includes a positioning device for resetting a previously adjusted longitudinal seat position, the positioning device comprising a positioning disk having a stop means, the positioning disk being rotatably mounted on a structural component forming part of the seat portion and being releasably secured against a force of a torsion spring, further comprising a rotary member for transposing a linear movement of the running rail relative to the guide rail in relation to a return pushing movement of the seat portion, the rotary member comprising a stop means, wherein the stop means of the positioning disk is configured to limit a rotary movement of the rotary member.

2. The longitudinal adjusting device according to claim 1, wherein the joint fitting comprises an adjusting and securing device for an inclination of the backrest.

3. The longitudinal adjusting device according to claim 1, further comprising at least one stop ring mounted between the positioning disk and the rotary member.

4. The longitudinal adjusting device according to claim 1, comprising a catch lever spring-biased in a locking direction, the catch lever being supported on the running rail for securing the positioning disk, wherein the catch lever is coupled to a release stirrup for the locking device through a connecting lever configured to be adjusted so as to be ineffective together with the locking device for enabling a forward swinging movement of the backrest.

5. The longitudinal adjusting device according to claim 4, wherein the connecting lever comprises a catch nose configured to act on the release stirrup and having a feeling projection, and a contact pressure spring for holding the feeling projection in contact with the release lever for actuating the release stirrup of the locking device, wherein the release lever is coupled through a Bowden cable to the catch device configured to facilitate a forward swinging movement of the backrest.

6. The longitudinal adjusting device according to claim 1, wherein the positioning disk is mounted on an axis attached to the running rail, the positioning disk having a recess for receiving a spiral spring having an inner end and an outer end, the inner end of the spiral spring being attached to the axis and the outer end of the spiral spring being secured to a periphery of the recess, the locking lever having a toothed segment, the outer circumference of the positioning disk having a toothing in engagement with the toothed segment of the locking lever, wherein the stop means of the positioning means is located on an end face of the positioning disk for resetting an adjusted longitudinal position of the seat when the seat is pushed backwardly.

7. The longitudinal adjusting device according to claim 6, further comprising a winding drum mounted on the axis of the positioning disk, the winding drum forming the rotary member, a pull cable being attached to and wound onto the winding drum, wherein a free end of the pull cable is configured to be attached to one of the guide rail and the vehicle, a second spiral spring being arranged in an interior of the winding drum concentrically or eccentrically relative to an outer surface of the winding drum, wherein an inner end of the second spiral spring is secured in a slot of the axis, while an outer end of the spiral spring is attached to the winding drum, wherein the winding drum comprises at an end face facing the positioning disk a stop means corresponding to the stop means of the positioning disk.

8. The longitudinal adjusting device according to claim 7, further comprising at least one stop ring arranged between the winding drum and the positioning disk for adapting the device to a maximum displacement distance of the running rail relative to the guide rail, the at least one stop ring having stop means, wherein the stop means of the at least one stop ring corresponds with respect to location and dimension to the stop means of the positioning disk and of the winding drum, wherein, when the previously adjusted seat adjusting position has been reached, all stop means rest against each other to form a stack of stop means.

9. The longitudinal adjusting device according to claim 8, further comprising a housing having a center, the axis for supporting the positioning disk, the winding drum and the at least one stop ring and for holding the spiral springs being mounted in the center of the housing, the housing having two cutouts, wherein an arm of the catch lever securing the positioning disk extends through one of the cutouts and the pull cable extends through another of the cutouts.

10. The longitudinal adjusting device according to claim 9, further comprising a support plate for supporting the housing receiving the positioning disk, the winding drum, the at least one stop ring and the spiral springs, wherein the support plate has pins for supporting the catch lever and the release lever, wherein the support plate is fixedly attached to the running rail and has an angular portion for supporting the Bowden cable.

11. The longitudinal adjusting device according to claim 10, comprising a support sleeve for the Bowden cable, the support sleeve being resiliently supported on the angular portion of the support plate.

12. The longitudinal adjusting device according to claim 1, wherein the spring member for forwardly biasing the running rail is comprised of a spiral spring.

13. The longitudinal adjusting device according to claim 12, wherein one end of the spiral spring is attached the running rail and another end of the spiral spring is attached to the guide rail, wherein the spiral spring reinforces in a self-winding manner a displacement movement of the seat portion.

14. The longitudinal adjusting device according to claim 12, wherein one end of the spiral spring is attached stationary relative to a rearward portion of the running rail and wherein another end of the spiral spring is attached to a winding drum rotatably mounted on the running rail, one end of a pull cable being attached to the winding drum, and another end of the pull cable being attached to a forward portion of the guide rail.

15. The longitudinal adjusting device according to claim 14, wherein the spiral spring is mounted in an interior of the winding drum having a constant winding diameter, and wherein an inner end of the spiral spring is attached to an axis mounted stationary relative to the running rail, the winding drum being mounted on the axis.

16. The longitudinal adjusting device according to claim 15, comprising a cup-shaped housing surrounding the winding drum, the axis being a stationary central component of the housing, wherein the housing has a cutout and the pull cable attached to the winding drum extends through the cutout.

17. The longitudinal adjusting device according to claim 14, wherein the winding drum has a non-constant winding diameter.

18. The longitudinal adjusting device according to claim 14, wherein the winding drum has at an inner circumference thereof a receiving means for attaching the outer end of the spiral spring, wherein the inner end of the spiral spring has an angled portion engaging in a slot of the axis surrounded by the spiral spring.

19. The longitudinal adjusting device according to claim 18, wherein the inner end of the spiral spring is attached to an adjusting element mounted so as to be rotatable but securable on the axis or in the housing.

20. A longitudinal adjusting device in a motor vehicle seat having a backrest and a seat portion, the longitudinal adjusting device comprising a joint fitting connecting the backrest to the seat portion, the joint fitting comprising a fitting component forming part of the seat portion and a pivotable fitting component forming part of the backrest, wherein one of the fitting components has a pivot point about which the backrest can be pivoted forwardly after release of a catch device, a rail arrangement comprising running rails attached to the seat portion and guide rails for longitudinally displaceably receiving the running rails, wherein at least one of the running rails is supported at one of the guide rails through a spring member such that the running rail is biased forwardly, wherein at least one of the running rails includes a locking device which is releasable for longitudinal adjustment, and wherein the locking device includes a positioning device for resetting a previously adjusted longitudinal seat position, the positioning device comprising a positioning disk having a stop means, the positioning disk being rotatably mounted on a structural component forming part of the seat portion and being releasably secured against a force of a torsion spring, further comprising a rotary member for transposing a linear movement of the running rail relative to the guide rail in relation to a return pushing movement of the seat portion, the rotary member comprising a stop means, wherein the stop means of the positioning disk is configured to limit a rotary movement of the rotary member, said positioning disk mounted on an axis attached to the running rail, the positioning disk further having a recess for receiving a spiral spring having an inner end and an outer end, the inner end of the spiral spring being attached to the axis and the outer end of the spiral spring being secured to a periphery of the recess, the locking lever having a toothed segment, the outer circumference of the positioning disk having a toothing in engagement with the toothed segment of the locking lever, wherein the stop means of the positioning means is located on an end face of the positioning disk for resetting an adjusted longitudinal position of the seat when the seat is pushed backwardly.

21. The longitudinal adjusting device according to claim 20, further comprising a winding drum mounted on the axis of the positioning disk, the winding drum forming the rotary member, a pull cable being attached to and wound onto the winding drum, wherein a free end of the pull cable is configured to be attached stationary relative to one of the guide rail and the vehicle, a second spiral spring being arranged in an interior of the winding drum concentrically or eccentrically relative to an outer surface of the winding drum, wherein an inner end of the second spiral spring is secured in a slot of the axis, while an outer end of the spiral spring is attached to the winding drum, wherein the winding drum comprises at an end face facing the positioning disk a stop means corresponding to the stop means of the positioning disk.

22. The longitudinal adjusting device according to claim 21, further comprising at least one stop ring arranged between the winding drum and the positioning disk for adapting the device to a maximum displacement distance of the running rail relative to the guide rail, the at least one stop ring having stop means, wherein the stop means of the at least one stop ring corresponds with respect to the location and dimension of the stop means of the positioning disk and of the winding drum, wherein, when the previously adjusted seat adjusting position has been reached, all stop means rest against each other to form a stack of stop means.

23. The longitudinal adjusting device according to claim 22, further comprising a housing having a center, the axis for supporting the positioning disk, the winding drum and the at least one stop ring and for holding the spiral springs being mounted in the center of the housing, the housing having two cutouts, wherein an arm of the catch lever securing the positioning disk extends through one of the cutouts and the pull cable extends through another of the cutouts.

24. The longitudinal adjusting device according to claim 23, further comprising a support plate for supporting the housing receiving the positioning disk, the winding drum, the at least one stop ring and the spiral springs, wherein the support plate has pins for supporting the catch lever and the release lever, wherein the support plate is fixedly attached to the running rail and has an angular portion for supporting the Bowden cable.

25. The longitudinal adjusting device according to claim 24, further comprising a support sleeve for the Bowden cable, the support sleeve being resiliently supported on the angular portion of the support plate.

26. A longitudinal adjusting device in a motor vehicle seat having a backrest and a seat portion, the longitudinal adjusting device comprising a joint fitting connecting the backrest to the seat portion, the joint fitting comprising a fitting component forming part of the seat portion and a pivotable fitting component forming part of the backrest, wherein one of the fitting components has a pivot point about which the backrest can be pivoted forwardly after release of a catch device, a rail arrangement comprising running rails attached to the seat portion and guide rails for longitudinally displaceably receiving the running rails, wherein at least one of the running rails is supported at one of the guide rails through a spiral spring such that the running rail is biased forwardly, wherein at least one of the running rails includes a locking device which is releasable for longitudinal adjustment, and wherein the locking device includes a positioning device for resetting a previously adjusted longitudinal seat position, the positioning device comprising a positioning disk having a stop means, the positioning disk being rotatably mounted on a structural component forming part of the seat portion and being releasably secured against a force of a torsion spring, further comprising a rotary member for transposing a linear movement of the running rail relative to the guide rail in relation to a return pushing movement of the seat portion, the rotary member comprising a stop means, wherein the stop means of the positioning disk is configured to limit a rotary movement of the rotary member, wherein one end of the spiral spring is attached stationary relative to a rearward portion of the running rail, and wherein another end of the spiral spring is attached to a winding drum rotatably mounted on the running rail, one end of a pull cable being attached to the winding drum, and the other end of the pull cable being attached to a forward position of the guide rail.

27. The longitudinal adjusting device according to claim 26, wherein the spiral spring is mounted in an interior of the winding drum having a constant winding diameter, and wherein an inner end of the spiral spring is attached to an axis mounted stationary relative to the running rail, the winding drum being mounted on the axis.

28. The longitudinal adjusting device according to claim 27, further comprising a cup-shaped housing surrounding the winding drum, the axis being a stationary central component of the housing, wherein the housing has a cutout and the pull cable attached to the winding drum extends through the cutout.

29. The longitudinal adjusting device according to claim 26, wherein the winding drum has a non-constant winding diameter.

30. The longitudinal adjusting device according to claim 26, wherein the winding drum has an inner circumference thereof a receiving means for attaching the outer end of the spring spiral, wherein the inner end of the spiral spring has an angled portion engaging in a slot of the axis surrounded by the spiral spring.

31. The longitudinal adjustment device according to claim 30, wherein the inner end of the spiral spring is attached to an adjusting element mounted so as to be rotatable but securable on the axis or in the housing.

* * * * *